Jan. 23, 1951  C. F. ROBINSON  2,539,163
STATIC DISCHARGER FOR AIRCRAFT
Filed Oct. 18, 1947  2 Sheets-Sheet 1
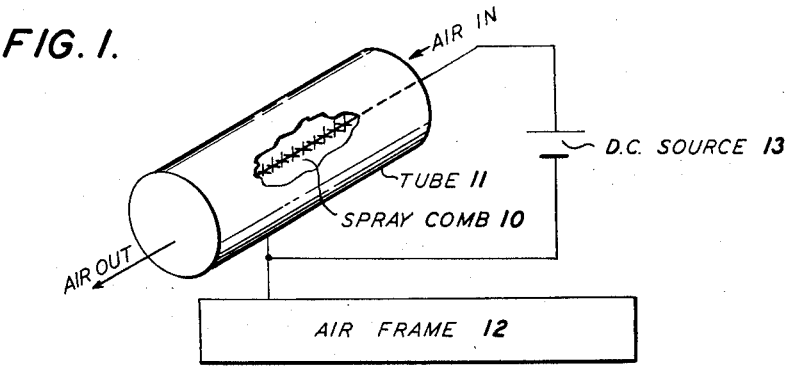
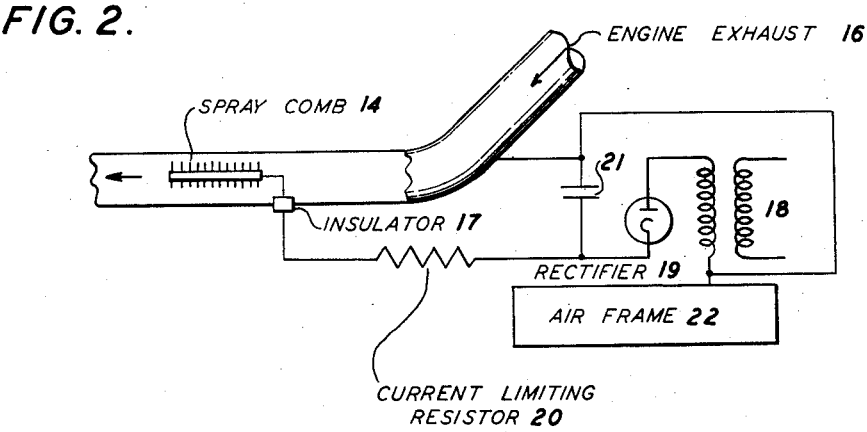
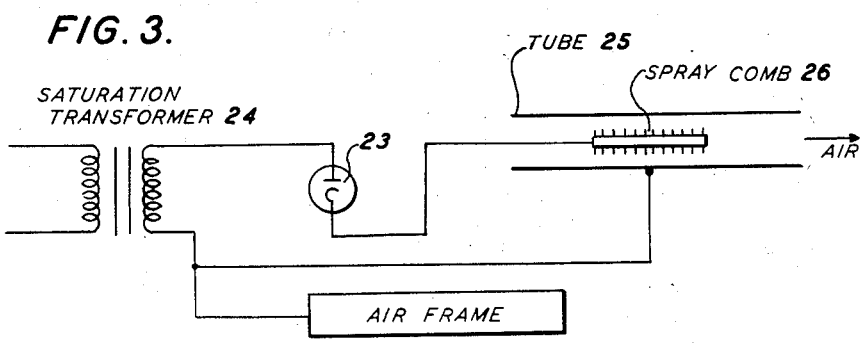
INVENTOR.
CHARLES F. ROBINSON
BY
ATTORNEYS Jan. 23, 1951     C. F. ROBINSON     2,539,163
STATIC DISCHARGER FOR AIRCRAFT Filed Oct. 18, 1947     2 Sheets-Sheet 2

INVENTOR.
CHARLES F. ROBINSON
BY
*Christie & Angus*
ATTORNEYS

Patented Jan. 23, 1951

2,539,163

UNITED STATES PATENT OFFICE 2,539,163

STATIC DISCHARGER FOR AIRCRAFT

Charles F. Robinson, Pasadena, Calif.

Application October 18, 1947, Serial No. 780,697

13 Claims. (Cl. 175—264)

This invention is concerned with electrostatic dischargers for aircraft and provides improved apparatus for discharging static electricity from aircraft to reduce or eliminate corona interference, commonly known as precipitation static.

Aircraft flying in stormy weather (when radio communication is particularly important) often encounter a severe form of radio interference sufficient to prevent all reception. This interference, which is called "precipitation static" comes about when the aircraft becomes electrically charged. The charging is caused by friction with atmospheric particles such as rain, snow, ice particles or dust. The charge may be positive or negative, but usually is the latter. The charging of the aircraft produces a potential gradient between it and its surroundings and if this gradient is allowed to build up to a sufficient level a corona discharge results. Corona discharges may also be caused by electrical fields induced in the aircraft in the vicinity of highly charged clouds.

The corona occur in regions of high electrical field built up adjacent sharp projections on the aircraft.

Efforts have been made heretofore to prevent the corona discharge from interfering with radio reception. Thus a so-called trailing wire discharger consisting of an appropriate length of small wire extending in flight from the tail of the aircraft has been employed. Another example of this class of discharger is one which employs needle points located on the extremities of the aircraft or on the propellers. A wick discharger which is essentially a small flexible treated cotton wick which may be enclosed in a plastic tube with many conducting fibers exposed at the end to serve as discharge points has also been suggested. Although these dischargers are all effective to some degree they have a number of limitations. The principal disadvantage resides in the fact that before any of these gaseous ion dischargers are effective the aircraft must be charged to an extremely high point, in which case radio interference begins before the dischargers become effective.

It has also been proposed to employ a second class of electrostatic dischargers employing heavy particles such as charged water droplets as charge carriers. Such equipment, although reasonably effective, has a number of draw backs. It requires a bulky and heavy tank of non-freezing liquid such as alcohol, and increases aerodynamic losses. To some extent these problems may be eliminated by employing a triboelectric discharger which employs particles of quartz or the like to dissipate the charge. However, a high level of noise intensity has been observed with this type of apparatus and there is no means of controlling the polarity thereof. These and other disadvantages prevent commercial use of this type of discharger.

To summarize, there is a distinct need for a satisfactory static discharger of simple design. I have developed such a discharger. Unlike prior devices, all of which depend for their operation on the aircraft having a high static charge, the device of my invention actually prevents the accumulation of static charge. In essence, my invention contemplates in aircraft a precipitation static discharger which comprises a spray comb associated with the aircraft in such position that a current of gas flows over it, the spray comb being insulated from the aircraft, and a source of direct current connected between the spray comb and the aircraft, i. e. its airframe. The spray comb consists of one or more sharp points and conveniently may be in the form of the spray comb employed in a Van de Graff generator.

Preferably a reversing switch is provided in the circuit between the aircraft and the spray comb, because the charge accumulated on the plane may be either positive or negative. Moreover, it is desirable to provide means for varying the potential of the direct current source, impressed between airframe and spray comb, so as to employ optimum potential.

The device of my invention is in effect an electrostatic generator which continuously discharges from the aircraft into the airstream and thus prevents the accumulation of charge.

Preferably the spray comb is mounted within a conductive tube which is grounded to the airframe and so disposed that a current of gas flows therethrough. The tube aids greatly in eliminating radio noise because a radio wave is rapidly attenuated in a tube that is properly dimensioned for the particular wave length. In other words, the tube acts as an attenuator for any radio waves generated by the spray comb and thus prevents them from affecting the radio receiver in the aircraft. Generally speaking a tube approximately 2 inches in diameter and 18 inches long is satisfactory, although the smaller the tube the more complete the radio wave attenuation. The invention is not limited to the use of a cylindrical tube, substantially any form of conductive closure or partial closure being highly satisfactory. Thus as hereinafter illustrated the spray comb need not be enclosed but best results are obtained when it is so enclosed. The term "tube" as used herein is intended to include any open ended container which encompasses the spray comb in part or in toto.

The tube may be so disposed that air passes through it from the atmosphere during flight or it may be fastened as an extension on an exhaust pipe of the motor, to the outlet line of the cabin ventilator system, or any other appropriate place. It is not necessary that a large amount of air pass over the comb and for this reason the device need not be mounted on an exposed surface of the aircraft.

The spray comb may take any one of a number of forms. Thus it may be in the form of a wire of "star" shaped cross section, or a rod provided with a number of sharp conducting points such as phonograph needles. A spray comb consisting of a conducting bar approximately $\frac{1}{16}$ by $\frac{5}{16}$ in cross section and 6 inches long with phonograph needles projecting therefrom on ¼ inch centers is satisfactory. The spray comb need not be metallic nor even a very good conductor. Such materials as yarn, spun glass, etc., may be treated so as to be made sufficiently conductive for this purpose.

In its preferred form the device of my invention comprises the following elements:

1. A spray comb;
2. A conductive grounded tube, (i. e. grounded to the airframe) large enough to accommodate the spray comb, which is usually disposed substantially coaxially therein. The spray comb need not be placed coaxially within the tube nor even parallel to the longitudinal axis thereof. However, placement thereof should be made having in mind the minimum permissible spark gap at the operating voltage. The tube is so placed that a current of gas resulting from the action of the motor, from the forward motion of the aircraft or other cause flows through the tube during its operation;
3. A direct current power supply capable of supplying approximately 10,000 volts at 2 to 3 milliamperes (20 to 30 watts) and capable of being controlled as to its on-off position. It is also desirable that polarity and voltage be controllable.

As already indicated the spray comb is electrically connected to the power supply and substantially insulated from the grounded metal tube in which it is coaxially disposed. The spray comb need not be completely insulated from the conductive tube so long as there is no appreciable shorting. Thus the air gap separating the two is adequate insulation. A high resistance connection between the two will probably not alter the operation materially. As soon as the power supply is turned on and the voltage reaches an appropriate level determined by atmospheric conditions and the physical dimensions of the spray comb, electrical charge will be sprayed from the points of the comb into the air passing through the tube. The charged air thus passes immediately into free space and results in the transfer of electrical charge from the aircraft into the atmosphere, thus charging or discharging the aircraft depending upon the degree and kind of control exercised. The device of the invention thus has its own power supply and does not depend on the charging of the aircraft by the atmosphere for its actuation.

Although for actual discharge it is not essential to employ a grounded conducting tube, this aspect of the invention is of substantial importance in reducing or eliminating radio interference. These and other aspects of my invention will be more thoroughly understood in the light of the following detailed description taken in conjunction with the accompanying drawings in which:

Fig. 1 is a diagram illustrating the action of a spray comb mounted within a tube grounded to the airframe, with a direct current source connected between the spray comb and the tube;

Fig. 2 is a diagram illustrating the application of the invention to the engine exhaust pipe of an aircraft;

Fig. 3 is a diagram illustrating a form of direct current power supply for the apparatus of Figs. 1 and 2;

Figure 4:
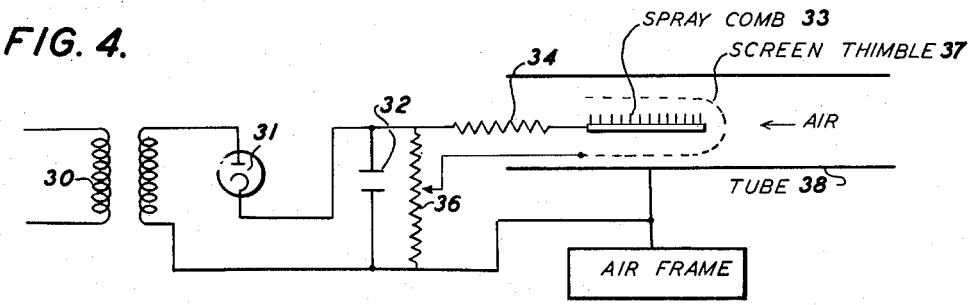
Fig. 4 is a diagram of a modified form of the apparatus of the invention employing a screen thimble to aid in discharge from the spray comb.
Figure 5:
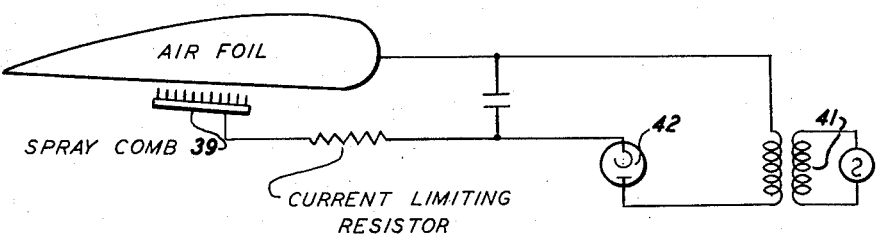
Fig. 5 is another diagram illustrating the use of the spray comb without the tube.
Figure 6:
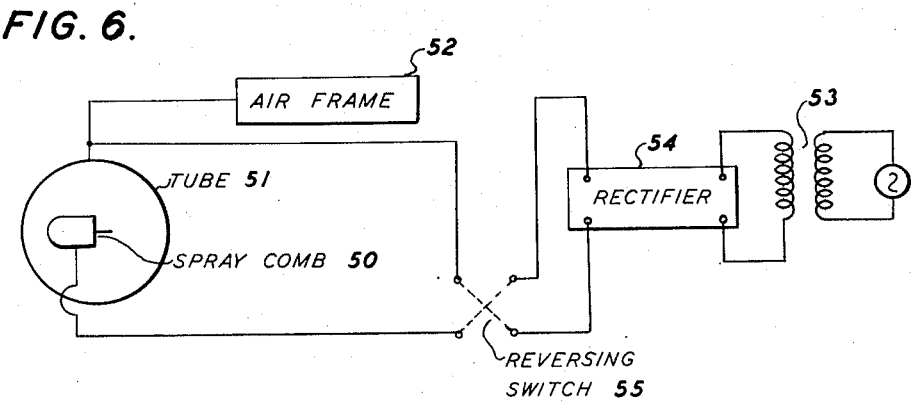
Fig. 6 illustrates the application of a reversing switch in the apparatus of the invention.

Referring to Fig. 1 it will be seen that a spray comb 10 consisting of one or more and preferably a plurality of sharp pointed projections is mounted in a spiral around a rod disposed in an open ended conducting tube 11 and insulated therefrom. This tube is grounded to the airframe 12. A direct current source 13 is connected between the spray comb and the tube. Although this and the following embodiments of the invention show the conductive tube grounded to the airframe it is equally within the contemplation thereof to so ground the spray comb instead.

In operation, air flows through the tube and a brush discharge is caused on the spray comb. This comb is disposed substantially centrally with respect to the length of the tube so that there is adequate opportunity for attenuation of any resulting radio waves from the brush discharge. Consequently, charge is removed from the airframe (or accumulated, depending on the polarity of the discharge device) without causing appreciable radio interference.

The direct current field on the spray comb forms positive and negative ions in a space close to the combs. Ordinarily, the ions of one sign migrate to the points of the spray comb and are collected thereon. The ions of the opposite sign try to travel to the tube wall, but in so doing are swept away by the air.

The apparatus illustrated in Fig. 2 is essentially the same as that of Fig. 1 in that it is provided with a spray comb 14 disposed in a conductive tube 15 which is grounded to the airframe by being fastened to the end of the engine exhaust pipe 16. Although the tube is here shown connected to the engine exhaust it is equally feasible to connect it to any other exhaust or ventilating duct. The apparatus requires only a comparatively low rate of air flow for satisfactory operation and substantially any gas stream will suffice. An insulator bushing 17 is disposed in the side of the tube and a lead from the spray comb passes therethrough. Direct current for the spray comb-tube circuit is provided by a transformer 18 the output of which is connected through a rectifier tube 19. A current limiting resistor 20 is provided on the output circuit and a condenser 21 is connected across the output circuit, which is grounded to the airframe 22. Alternating current applied to the transformer is rectified by the tube and impressed between the spray comb and the static eliminating tube 15. If desired, potential control means (such as a potentiometer on the input side of the transformer) may be employed. Likewise, a reversing switch (not shown) may be connected in the output circuit. The use of condenser 21 results in somewhat increased efficiency but is not an essential feature.

The apparatus of Fig. 3 is essentially the same as that of Fig. 1, except that instead of employing a current limiting resistor on the output of the rectifier tube 23 a saturation transformer 24 is employed. If the gap between the tube 25 and the spray comb 26 should break down so that sparking tends to occur, the rectifier tube tries to draw excessive current so that the voltage across the gap is automatically reduced.

A third alternative is to employ a rectifier tube which will withstand the full transformer voltage, and the anode current of which will saturate at a current below that which will cause sparking between spray comb and tube.

With high gas velocities through the tube in which the spray comb is mounted, both negative and positive ions may be swept out, with the result that there is insufficient change of charge on the airframe. This sweeping out of both negative and positive ions may be prevented by the use of comparatively low rates of air flow, or alternatively with the apparatus of Fig. 4. As in the case of the previous apparatus, the direct current power supply includes a transformer 30 the output of which is connected across a rectifier tube 31 and a condenser 32. The condenser 32 is not absolutely essential to effective operation. The spray comb 33 is connected in this circuit to a current limiting resistor 34. A voltage divider 36 is connected across the circuit and an intermediate point of this voltage divider is connected to a screen thimble 37. This thimble is disposed aound the spray comb within the conducting tube 38 and its front end is substantially closed. The thimble may be made of perforated plate, screen cloth, or any other perforated conductive material. Its function is to prevent ions of one sign from being carried away from the points of the spray comb in the airstream, while permitting ions of the opposite sign to migrate out and be discharged with the air. The sign of the respective ions will depend upon the polarity of the circuit. Means for controlling the polarity is shown in Fig. 6. The apparatus of Fig. 4 is so designed that the screen thimble is at a potential intermediate that of the tube and the spray comb. Although such potential has been found to be optimum the apparatus works satisfactorily when the screen is at a non-intermediate potential.

Referring now to Fig. 5 it will be noted that in this instance, the conductive tube is eliminated, a spray comb 39 being disposed immediately below an airfoil 40 of the aircraft. As in the previous cases a direct current power supply includes a transformer 41 the output of which is connected to a rectifier tube 42. A current limiting resistor is employed to prevent the spray comb from drawing excessive current in the event of a spark over between the airfoil (which is conductive) and the spray comb.

Although the spray comb is shown in Fig. 5 to be adjacent an airfoil such position is only illustrative of the placement of the comb adjacent any conductive surface of the airframe. For purposes of aerodynamic efficiency the comb may preferably be mounted at some point other than adjacent the airfoil.

Generally speaking, the charge developed on an aircraft by friction with atmospheric particles such as dust, rain, etc., is negative. However, positive charges are not unusual and to this end it may be necessary to employ reverse charging in the spray comb combination. Apparatus for this purpose is shown in Fig. 6 wherein a spray comb 50 is mounted within a conductive tube 51 grounded to an airframe 52. A direct current supply includes a transformer 53 which feeds a rectifier 54, the output of which is connected between the tube and spray comb through a reversing switch 55. By changing the polarity of this switch, the spray comb may be made either positive or negative with respect to the tube and in this way employed to neutralize the charge which tends to build up in the aircraft as precipitation static.

The apparatus of my invention has a number of advantages, not the least of which is mechanical simplicity and low maintenance since it need have no moving parts other than voltage control knobs on the power supply. Moreover, since the device, which may be located conveniently for adjustment during flight, does not depend on the charging of the aircraft for its actuation, it is possible to maintain the aircraft accurately at ground or any other desired potential. It is not necessary for the operation of the apparatus that the aircraft accumulate a charge which may already have begun to interfere with the radio operation before static discharge of the aircraft takes place.

Another important advantage of the discharger of the invention is its lightness attained by reason of the fact that no expendible materials (such as water or quartz crystals) are required. This feature reduces the non-paying load of an aircraft by many hundreds of pounds. Further as a result of the fact that only a small gas stream is required for efficient operation of the device, it need not be placed on an exposed surface of the plane and thus does not increase the plane's air resistance.

The placing of the spray comb within the grounded conductive tube provides a high degree of electrical shielding against any radio interference which might result from the operation of the spray comb. If the tube extends beyond the ends of the spray comb in each direction by an appropriate amount, radio interference resulting from the operation of the comb is reduced to a negligible factor.

I claim:

1. In aircraft, a precipitation static discharger grounded to the airframe of the aircraft and comprising a conductive tube so disposed that a current of gas flows therethrough, a spray comb mounted in the tube and insulated therefrom, and a direct current source connected between the tube and the spray comb the voltage of said source being at least as great as that required to produce electrical breakdown in the region of the spray comb.

2. In aircraft, a precipitation static discharger which comprises a conductive tube grounded to the airframe thereof and so disposed that a current of gas flows therethrough, a spray comb mounted in the tube and insulated therefrom, and a direct current source connected between the tube and the spray comb the voltage of said source being at least as great as that required to produce electrical breakdown in the region of the spray comb.

3. In aircraft, a precipitation static discharger which comprises a conductive tube grounded to the airframe thereof and so disposed that a current of gas flows therethrough, a spray comb mounted in the tube and insulated therefrom, a direct current source connected between the tube and the spray comb the voltage of said source being at least as great as that required to produce electrical breakdown in the region of the spray comb, and means for varying the potential of the current.

4. In aircraft, a precipitation static discharger which comprises a conductive tube mounted to the aircraft and grounded to the airframe thereof and so disposed that a current of gas flows therethrough, a spray comb mounted in the tube and insulated therefrom, a direct current source connected between the tube and the spray comb the voltage of said source being at least as great as that required to produce electrical breakdown in the region of the spray comb, and means for reversing the direction of current flow between the tube and spray comb.

5. In aircraft, a precipitation static discharger which comprises a conductive tube grounded to the airframe of the aircraft and so disposed that a current of gas flows therethrough, a spray comb mounted in the tube and insulated therefrom, a direct current source connected between the tube and the spray comb the voltage of said source being at least as great as that required to produce electrical breakdown in the region of the spray comb, means for varying the potential of said direct current, and means for reversing the polarity of said direct current.

6. In aircraft, a precipitation static discharger which comprises a conductive tube grounded to the airframe of the aircraft and so disposed that a current of gas flows therethrough, a spray comb mounted in the tube and substantially insulated therefrom, with the tube extending beyond both ends of the spray comb, and a direct current source connected between the tube and the spray comb the voltage of said source being at least as great as that required to produce electrical breakdown in the region of the spray comb.

7. In aircraft, a precipitation static discharger which comprises a conductive tube mounted on the aircraft and grounded to the airframe thereof and so disposed that a current of gas flows therethrough, a spray comb mounted substantially coaxially in the tube and substantially insulated therefrom, and a direct current source connected between the tube and the spray comb the voltage of said source being at least as great as that required to produce electrical breakdown in the region of the spray comb.

8. In aircraft, a precipitation static discharger which comprises a conductive tube mounted on the aircraft and grounded to the airframe thereof and so disposed that a current of gas flows therethrough, the tube being fastened to a gas exhaust, a spray comb mounted in the tube and insulated therefrom, and a direct current source connected between the tube and the spray comb the voltage of said source being at least as great as that required to produce electrical breakdown in the region of the spray comb.

9. In aircraft, a precipitation static discharger which comprises a conductive tube mounted on the aircraft and grounded to the airframe thereof and so disposed that a current of gas flows therethrough, a spray comb mounted in the tube and insulated therefrom, with the tube extending beyond both its ends, a direct current source connected between the tube and the spray comb the voltage of said source being at least as great as that required to produce electrical breakdown in the region of the spray comb, and means for varying the potential of the direct current thus impressed.

10. In aircraft, a precipitation static discharger which comprises a conductive tube mounted on and grounded to the aircraft and so disposed that a current of gas flows therethrough during flight, a spray comb mounted in the tube and insulated therefrom, a direct current source connected between the tube and the spray comb the voltage of said source being at least as great as that required to produce electrical breakdown in the region of the spray comb, a screen disposed around the spray comb within the tube, and means for connecting the screen to the source.

11. In aircraft a precipitation static discharger which comprises a conductive tube mounted on and grounded to the aircraft and so disposed that a current of gas flows therethrough during flight, a spray comb mounted in the tube and insulated therefrom, a direct current source connected between the tube and the spray comb the voltage of said source being at least as great as that required to produce electrical breakdown in the region of the spray comb, a screen disposed around the spray comb within the tube, and means for connecting the screen to the source to maintain potential of the screen intermediate the potentials on the tube and the spray comb.

12. Apparatus according to claim 10 in which an end of the screen is closed.

13. In aircraft, a precipitation static discharger which comprises a conductive tube mounted on and grounded to the aircraft and so disposed that a current of gas flows therethrough, a spray comb mounted in the tube and insulated therefrom, a direct current source connected between the tube and the spray comb the voltage of said source being at least as great as that required to produce electrical breakdown in the region of the spray comb, a screen disposed around the spray comb within the tube, and means for connecting the screen to the source and means for varying the potential impressed by the source between the tube and the spray comb.

CHARLES F. ROBINSON.

REFERENCES CITED

The following references are of record in the file of this patent:

UNITED STATES PATENTS

| Number | Name | Date |
|---|---|---|
| 940,430 | Chapman | Nov. 16, 1909 |
| 2,303,321 | Bennett | Dec. 1, 1942 |
| 2,320,146 | Leake | May 25, 1943 |
| 2,352,411 | Sandretto | June 27, 1944 |
| 2,386,647 | Andresen | Oct. 9, 1945 |